United States Patent [19]

Milocco et al.

[11] Patent Number: 5,185,379
[45] Date of Patent: Feb. 9, 1993

[54] METHOD FOR REGENERATING WATER SOFTENER IN A WASHING MACHINE

[75] Inventors: Claudio Milocco; Rosa Sist, both of Pordenone, Italy

[73] Assignee: Zanussi Elettrodomestici S.p.A., Pordenone, Italy

[21] Appl. No.: 811,034

[22] Filed: Dec. 20, 1991

[30] Foreign Application Priority Data

Jan. 29, 1991 [IT] Italy .................. PN91 A 000003

[51] Int. Cl.⁵ .................. B01J 39/18; B01J 39/08; B08B 3/02; B08B 13/00
[52] U.S. Cl. .................. 521/26; 134/57 D; 134/95.1; 134/98.1; 210/666; 210/670; 210/676
[58] Field of Search .............. 521/26; 134/57 D; 210/676, 670, 666

[56] References Cited

FOREIGN PATENT DOCUMENTS 0219704  4/1987  European Pat. Off. .

*Primary Examiner*—Joseph L. Schofer
*Assistant Examiner*—Fred Zitomer
*Attorney, Agent, or Firm*—Wenderoth, Lind & Ponack

[57] ABSTRACT

A method is provided for regenerating a mass of active resin contained in a water softening device connected in the water filling circuit of a washing machine. The water softener device has an internal volume which is equal to the sum of the volume of the mass of resin plus a free volume, and is selectively supplied with both fresh water and brine through respective valves controlled by a program control device. The water softening device is supplied with a volume of brine during a first period of time, and is subsequently supplied with a complementary volume of water during a second period of time. The sum of the volume of brine, which is selected according to the hardness of the supply water, and the complementary volume of water is equal to the free volume of the water softening device.

3 Claims, 1 Drawing Sheet

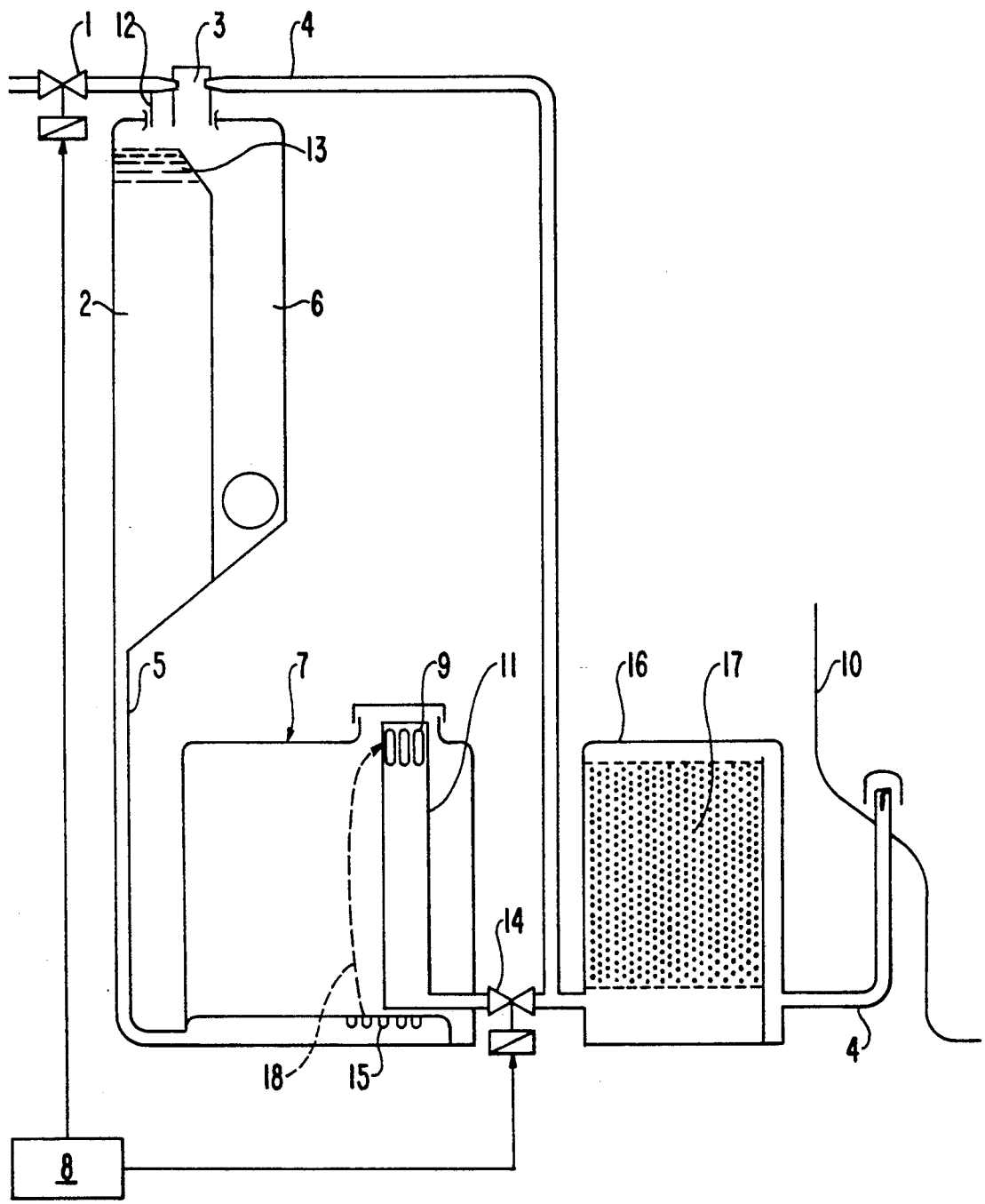

METHOD FOR REGENERATING WATER SOFTENER IN A WASHING MACHINE

BACKGROUND OF THE INVENTION

The present invention relates to an improved method for regenerating water softener in a washing machine, particularly in an automatic dishwashing machine.

As is common knowledge, the water supply circuit of machines such as automatic dishwashing machines is usually provided with a water softening device containing active resins that are regenerated periodically by the addition of metered quantities of brine. This brine is formed by passing water through a salt reservoir. In order that the extent of the regeneration of the water softener corresponds to the actual degree of hardness of the supply water, the quantity of brine to be metered into the water softening device is appropriately adjusted.

In an alternative method, the water softener is regenerated through the addition of a constant quantity of brine thereto, the salt concentration of which is varied accordingly in this case. Such a method is disclosed, for instance, in EP-B-0 219 704, in which mechanical means are provided to vary the salt concentration by changing the length of the average flow path of a predetermined volume of regeneration water passing through a mass of salt situated inside a specially provided reservoir. In this way, in the case of a very high degree of hardness of the supply water, it is practically possible to do away with the need of using considerable volumes of brine which might otherwise overflow into the wash tank of the machine and give rise to corrosion problems. On the other hand, the means for adjusting the salt concentration, which are housed within the salt reservoir, may turn out to be quite difficult to reach and their adjustment may turn out to be undesirably inaccurate.

SUMMARY OF THE INVENTION

It is the main object of the present invention to provide a method for regenerating water softener in a washing machine, which will enable the extent of the regeneration of the water softener to be easily, conveniently and accurately adjusted according to the degree of hardness of the supply water, and which will not create any corrosion problem in the washing tank of the machine.

It is a further object of the present invention to provide a water softener regeneration method which can be implemented in a washing machine provided with a water supply circuit that is substantially simple and reliable in its design.

BRIEF DESCRIPTION OF THE DRAWINGS

Other features and advantages of the invention will become apparent in the following description, by way of non-limiting example, with reference to the accompanying FIGURE, which is a schematic view of a preferred embodiment of the water supply circuit of a washing machine which is capable of performing the method according to the present invention.

DETAILED DESCRIPTION OF THE PREFERRED EMBODIMENT

Referring now to the FIGURE, numeral 10 designates the wash tank (shown only partially) of an automatic washing machine, such as a domestic dishwashing machine. The wash tank 10 is adapted to be supplied with fresh water by means of a water supply pipe 4 in which a controlled inlet valve 1, an air space 3 and a water softening device 16 are provided in series. In a per se known way, the water softening device 16 houses a granular mass 17 of ion-exchange resin, or similar active resins, which are capable of reducing the hardness of the fresh water and which requires periodical regeneration. The granular mass 17 only partially fills the water softening device 16, the overall internal volume of which therefore also includes a free volume which is not occupied by granular mass 17, and to which reference will be made hereinafter.

In a similarly per se known way, water leaking into the air space 3 is collected in an underlying tray 6, the bottom of which is connected with the wash tank 10. The water supply pipe 4 is preferably provided upstream of the air space 3 with a bifurcation 12 having a calibrated cross section and adapted to deliver water to a storage reservoir 2 communicating with the collection reservoir 6, and therefore with the outside environment, through an overflow partition wall 13. Tubing 5 connects the bottom portion of the storage reservoir 2 with the inlet of an underlying salt reservoir 7. In a preferred way, such an inlet comprises a perforated diffuser 15 located on the bottom of the reservoir 7. The latter is further provided with an outlet which preferably comprises a hollow outlet body 11 extending upwards within the salt reservoir 7. The hollow outlet body 11 is provided with at least an upper opening 9 and its bottom portion is connected with the water supply pipe 4, upstream of the water softening device 16, through a controlled valve 14.

The valves 1 and 14 are controlled by the program control device of the machine, which is schematically shown and designated by numeral 8 in the FIGURE. The program control device 8 is of a per se known type, such as for instance of an electromechanical type. In a preferred way, however, the program control device is of an electric type, including for instance, a Motorola 6804 or 6805 microprocessor.

In any case, the program control device 8 is programmed to control one or more operational cycles of the machine, as may be selected by the user, whereby the phases of these cycles are automatically performed in sequence. In a substantially conventional way, the operational cycles may include a series of phases such as a water fill phase, different washing and rinsing phases, a water discharge phase, a water softener regeneration phase, etc. Preferably, but not exclusively, each of the water softener regeneration phases is carried out at the end of a corresponding water fill phase.

As should be clearly apparent to anyone skilled in the art, the program control device 8, and in particular the microprocessor associated therewith, is able to establish the operational cycle to be carried out by the machine in a per se known manner by setting various process parameters (such as for instance the moments at which the various functional parts of the machine are to be actuated or energized, the duration of actuation or energization thereof, etc.) determining the timing of the phases making up the various selectable operational cycles of the machine.

For instance, in order to perform a water fill phase, the program control device 8 causes the valve 1, which is of the same normally closed type as the valve 14, to open for a pre-set period of time. A corresponding quantity of water from the mains is then let into the wash tank 10 through the water supply pipe 4, after having been appropriately softened by the granular mass 17 of resins in the water softening device 16. During this phase, the storage reservoir 2 is filled with water from the bifurcation 12 of the water supply pipe 4.

The various washing, rinsing and similar phases are substantially of a traditional type. As such, they do not form any particular part of the invention and will therefore not be described any further for the sake of simplicity.

However, according to a main feature of the invention, each regeneration phase is carried out in at least two distinct, sequential periods of time. In a first time period, the program control device 8 causes the valve 14 to open, while the other valve 1 remains in its closed condition. Consequently, a corresponding volume of water stored in the reservoir 2 flows by gravity through the tubing 5, passes through the mass of salt housed in the reservoir 7 and enters the water softening device 16 through the valve 14.

Inside the salt reservoir 7, in particular, the water flows from the diffuser 15 towards the opening 9 of the hollow outlet body 11 and, in doing this, it follows a predetermined average path which is schematically designated by numeral 18 in the FIGURE. The water converts therefore into brine having a predetermined salt concentration, preferably close to saturation.

The program control device 8 can control the valve 14 to allow any volume of brine, between minimum and maximum volumes, to flow into the water softening device 16. Therefore, by programming the program control device 8, for instance when installing the machine, the duration of the afore-described first period in which the valve 14 is opened can be set so that the volume of the brine flowing into the water softening device 16 will correspond to the degree of hardness of the supply water.

In accordance with a further aspect of the invention, the above-mentioned maximum volume is smaller than the aforementioned free volume of the water softening device 16, while the minimum volume can be decided upon and set by the manufacturer according to actual needs.

After this first period of the regeneration phase, the program control device 8 then causes the valve 1 to open for a second period of time during which the valve 14 is returned to its closed condition. This brings about the inflow of a complementary volume of water from the mains through the water softening device 16, which is instrumental in displacing the volume of brine previously let into the water softening device 16 and bringing it into contact with the entire granular mass 17 of resin.

During the regeneration phase, the granular mass 17 is stirred and mixed up by the water and brine mixture, so that a regeneration process is brought about and completed in a thorough and effective way.

Quite obviously, during the second period of the regeneration phase, the brine let into the water softening device 16 during the first period is diluted by the complementary volume of water from the mains. Therefore, appropriate consideration of this dilution should be taken in establishing the duration of the first and second periods to effectively deal with the degree of hardness of the fresh water from the mains. This, however, is a mere problem of general dimensioning of the machine, which is therefore within the ability of one skilled in the art, and which can be easily and accurately solved particularly when a program control device 8 of an electronic type is employed.

According to a further aspect of the invention, the program control device 8 can set the duration of the second period of the regeneration phase such that the complementary volume of water let into the water softening device 16 from the mains is substantially equal to and in any case not greater than the difference between the aforementioned free volume of the water softening device 16 and the volume of brine let into the water softening device 16 during the first period of the regeneration phase.

Such a setting of the program control device 8, which can for instance be carried out when the machine is being installed, enables the entire granular mass 17 of resin to be regenerated, while at the same time preventing the brine from flowing over into the wash tank 10, where it might give rise to the aforementioned corrosion problems.

It should be noted that the term "free volume of the water softening device 16" is to be understood as not referring solely to the volume of the water softening device 16 which is not actually occupied by the granular mass 17 of resin, but also includes the volume of that portion of the water supply pipe 4 situated downstream of the water softening device 16.

From the above description and considerations, it is apparent that the method according to the invention can be implemented practically, easily and accurately in a washing machine of a substantially per se known type, without the need for special adjustment means.

It will also be appreciated that the above-described method may be modified in various ways without departing from the scope of the invention. For instance, the periods during which both of the valves 1 and 14 are open during each regeneration phase, and therefore also the volumes of brine and water that are let into the water softening device 16, can vary depending upon the general dimensions of the machine.

Furthermore, the method according to the invention can similarly be implemented in a washing machine equipped with a water supply circuit different from that described above. For instance, the tubing 5 can connect the salt reservoir 7 with the water supply mains, rather than with the storage reservoir 2, preferably through the valve 1. In such a case, of course, the valve 1 will be opened even during the second period of the regeneration phase. In an alternative approach, the controlled valve 1 may be a two-way valve controlled by the program control device 8 in such a way as to selectively place the water supply mains in communication with the tubing 5 and the pipe 4 during the first and second periods, respectively, of the regeneration phase.

What is claimed is:

1. In a washing machine having a water softening device containing water softener in the form of a mass of active resin, and which device has a volume equal to the volume of the mass of active resin contained therein plus a free volume, a method for regenerating the water softener comprising the steps of:
   supplying brine to the water softening device during a first predetermined period of time, thereby metering the amount of brine supplied to the water softener contained therein;
   subsequently supplying fresh water to the water softening device during a second period of time, thereby metering the amount of fresh water supplied; and regulating the durations of said first and second periods of time such that the sum of the metered volume of brine and the metered volume of fresh water is substantially equal to said free volume of the water softening device.

2. The method of regenerating water softener in a washing machine as claimed in claim 1, wherein the duration of the first period of time is regulated such that the amount of brine supplied to said water softening device is proportional to the degree of hardness of water supplied to the washing machine from main water lines.

3. The method of regenerating water softener in a washing machine as claimed in claim 1, wherein said first and said second periods of time are regulated such that said sum of the metered volume of brine and the metered volume of fresh water is less than or equal to said free volume.

* * * * *